United States Patent
Moezzi Madani et al.

(10) Patent No.: US 9,142,060 B2
(45) Date of Patent: Sep. 22, 2015

(54) COMPUTATION REDUCED TESSELLATION

(75) Inventors: Nariman Moezzi Madani, San Diego, CA (US); Jian Mao, San Diego, CA (US); Vineet Goel, Winter Park, FL (US)

(73) Assignee: QUALCOMM Incorporated, San Diego, CA (US)

( * ) Notice: Subject to any disclaimer, the term of this patent is extended or adjusted under 35 U.S.C. 154(b) by 358 days.

(21) Appl. No.: 13/599,218

(22) Filed: Aug. 30, 2012

(65) Prior Publication Data

US 2014/0063012 A1    Mar. 6, 2014

(51) Int. Cl.
G06T 17/20    (2006.01)

(52) U.S. Cl.
CPC ........................................ *G06T 17/20* (2013.01)

(58) Field of Classification Search
None
See application file for complete search history.

(56) References Cited

U.S. PATENT DOCUMENTS

| | | | |
|---|---|---|---|
| 5,488,684 A | 1/1996 | Gharachorloo et al. | |
| 6,028,607 A | 2/2000 | Chan | |
| 6,211,883 B1 | 4/2001 | Goel | |
| 6,438,266 B1 | 8/2002 | Bajaj et al. | |
| 6,445,389 B1 | 9/2002 | Bossen et al. | |
| 6,462,738 B1 | 10/2002 | Kato | |
| 6,597,356 B1 | 7/2003 | Moreton et al. | |
| 6,600,488 B1 * | 7/2003 | Moreton et al. | 345/423 |
| 6,747,644 B1 | 6/2004 | Deering | |
| 6,906,716 B2 | 6/2005 | Moreton et al. | |
| 6,940,505 B1 | 9/2005 | Savine et al. | |
| 7,423,644 B2 | 9/2008 | Goel et al. | |
| 8,120,607 B1 | 2/2012 | Legakis et al. | |
| 8,599,202 B1 * | 12/2013 | Legakis et al. | 345/423 |
| 2008/0024491 A1 | 1/2008 | Sathe et al. | |
| 2009/0237401 A1 | 9/2009 | Wei et al. | |
| 2010/0164955 A1 | 7/2010 | Sathe et al. | |
| 2010/0214294 A1 | 8/2010 | Li et al. | |
| 2011/0057931 A1 | 3/2011 | Goel et al. | |
| 2011/0063294 A1 | 3/2011 | Brown et al. | |
| 2011/0128285 A1 | 6/2011 | Gong | |
| 2011/0267346 A1 | 11/2011 | Howson | |
| 2011/0310102 A1 | 12/2011 | Chang | |
| 2014/0063013 A1 | 3/2014 | Goel et al. | |
| 2014/0063014 A1 | 3/2014 | Goel et al. | |

OTHER PUBLICATIONS

Chhugani et al., "Geometry Engine Optimization: Cache Friendly Compressed Representation of Geometry", Proceedings I3D 2007, Apr. 30-May 2, 2007, 8 pp. XP040058183.

(Continued)

*Primary Examiner* — Daniel Hajnik
(74) *Attorney, Agent, or Firm* — Shumaker & Sieffert, P.A.

(57) ABSTRACT

Systems and methods for a tessellation are described. The tessellation unit is configured to determine a number of points that reside along a first edge of a first ring within a domain, determine a first set of coordinates for a first portion of the points that reside along the first edge of the first ring within the domain, and determine a second set of coordinates for a second portion of the points that reside along the first edge of the first ring within the domain based on the first set of coordinates for the first portion. The tessellation unit is also configured to stitch points that reside along the first edge of the first ring with points that reside along a second edge of a second ring to divide the domain into a plurality of primitives that are mapped to a patch.

29 Claims, 6 Drawing Sheets

(56) References Cited

OTHER PUBLICATIONS

Choi et al., "Adaptive Tessellation of PN Triangles Using Minimum-Artifact Edge Linking," IEICE Transactions on Fundamentals of Electronics, Communications and Computer Sciences, Engineering Sciences Society, vol. E87-A, No. 10, Oct. 2004, 8 pp. XP001210488, ISSN: 0916-8508.

Espino et al., "Hardware support for adaptive tessellation of Bezier surfaces based on local tests", Journal of Systems Architecture, vol. 53, No. 4, Apr. 2007, 18 pp. XP005891873, ISSN: 1383-7621.

Hoppe, "Optimization of Mesh Locality for Transparent Vertex Caching", Computer Graphics Proceedings, Annual Conference Series, SIGGRAPH 99, Aug. 8-13, 1999, 8 pp., XP000981469.

International Search Report and Written Opinion—PCT/US2013/055185—ISAEPO—Jan. 29, 2014, 15 pp.

Livny et al., "Seamless patches for GPU-based terrain rendering," The Visual Computer; International Journal of Computer Graphics, vol. 25, No. 3, Mar. 11, 2008, 12 pp. XP019711678, ISSN: 1432-2315.

Luo et al., "Key Technology Research on Data Conversion between B-Rep Based CAD and VR Model", Measuring Technology and Mechatronics Automation, 2009, ICMTMA '09, International Conference on, IEEE, Apr. 11-12, 2009, 4 pp. XP031511401, ISBN: 978-0-7695-3583-8.

Moreton, "Watertight Tessellation using Forward Differencing", HWWS 01 Proceedings of the ACM SIGGRAPH/EUROGRAPHICS workshop on Graphics hardware, Dec. 2001, 8 pp. XP055056554.

Ni et al., "Efficient substitutes for subdivision surfaces", ACM SIGGRAPH 2009 Course Notes, Aug. 5, 2009, 107 pp. XP055084843.

Taubin et al., "Geometric Compression through Topological Surgery," MPEG Meeting; San Jose; (Motion Picture Expert Group or ISO/IEC JTC1/SC29/WG11), No. M3059, Feb. 1997, 16 pp. XP030032332, ISSN: 0000-0315.

Yang et al., CAD data visualization on mobile devices using sequential constrained Delaunay triangulation, Computer Aided Design, Elsevier Publishers, vol. 41, No. 5, May 2009, 10 pp. XP026096451, ISSN: 0010-4485.

Gee, "Introduction to the Direct3d 11 Graphics Pipeline," 2008 NVIDIA Corporation, Aug. 2008, The World of Visual Computing, pp. 1-55.

"Microsoft Tessellation Overview," Windows Dev Center—Desktop, retrieved Feb. 22, 2012, pp. 1-6.

Naty, "Direct3d11 Details Part II: Tessellation," Real-Time Rendering, Aug. 2, 2008, pp. 1-3.

U.S. Appl. No. 13/599,747, by Vineet Goel, filed Aug. 30, 2012.

U.S. Appl. No. 13/599,645, by Vineet Goel, filed Aug. 30, 2012.

Bill Bilodeau, "Report Information from ProQuest-Decal Tessellation," Feb. 19, 2012, 11 pp.

Second Written Opinion from International Application No. PCT/US2013/055185, dated Dec. 22, 2014, 9 pp.

International Preliminary Report on Patentability from International Application No. PCT/US2013/055185, dated Jan. 23, 2015, 10 pp.

\* cited by examiner

COMPUTATION REDUCED TESSELLATION

TECHNICAL FIELD

This disclosure relates to techniques for tessellation as part of rendering computer graphics.

BACKGROUND

A graphics processing unit (GPU) may implement a graphics processing pipeline that includes a tessellation stage. The tessellation stage converts a surface into a plurality of primitives on the GPU, resulting in a more detailed surface. For example, the GPU can receive information for a coarse surface, and generate a high resolution surface, rather than receiving information for the high resolution surface. Receiving information for the high resolution surface, rather than the coarse surface, may be bandwidth inefficient because the amount of information needed to define the high resolution surface may be much greater than the amount of information needed to define the coarse resolution surface.

SUMMARY

In general, the techniques described in this disclosure are directed to determining coordinates for points along first and second portions of an edge of a ring within a domain used for tessellating. In an example, a tessellation unit for graphics processing may determine coordinates for points along the first portion of the edge. The tessellation unit may determine the coordinates for points along the second portion of the edge based on the coordinates for the points along the first portion of the edge.

The points along the edge may form vertices of primitives within the domain. By determining coordinates for the points of the second portion with the coordinates of the points of the first portion, the example tessellation unit may exploit symmetry within vertices of the primitives within the domain.

In one example, the disclosure describes a tessellation unit for graphics processing. The tessellation unit includes a first unit configured to determine a number of points that reside along a first edge of a first ring within a domain, determine a first set of coordinates for a first portion of the points that reside along the first edge of the first ring within the domain, and determine a second set of coordinates for a second portion of the points that reside along the first edge of the first ring within the domain based on the first set of coordinates for the first portion. The tessellation unit also includes a second unit configured to stitch one or more points that reside along the first edge of the first ring, based on the first set of coordinates and the second set of coordinates, with points that reside along a second edge of a second ring to divide the domain into a plurality of primitives that are mapped to a patch to increase a resolution of the patch, wherein the second ring is inner to the first ring within the domain.

In another example, the disclosure describes a method of tessellation including determining a number of points that reside along a first edge of a first ring within a domain, determining a first set of coordinates for a first portion of the points that reside along the first edge of the first ring within the domain, determining a second set of coordinates for a second portion of the points that reside along the first edge of the first ring within the domain based on the first set of coordinates for the first portion, and stitching one or more points that reside along the first edge of the first ring, based on the first set of coordinates and the second set of coordinates, with points that reside along a second edge of a second ring to divide the domain into a plurality of primitives that are mapped to a patch to increase a resolution of the patch, wherein the second ring is inner to the first ring within the domain.

In another example, the disclosure describes a tessellation unit including means for determining a number of points that reside along a first edge of a first ring within a domain, means for determining a first set of coordinates for a first portion of the points that reside along the first edge of the first ring within the domain, and means for determining a second set of coordinates for a second portion of the points that reside along the first edge of the first ring within the domain based on the first set of coordinates for the first portion, and means for stitching one or more points that reside along the first edge of the first ring, based on the first set of coordinates and the second set of coordinates, with points that reside along a second edge of a second ring to divide the domain into a plurality of primitives that are mapped to a patch to increase a resolution of the patch, wherein the second ring is inner to the first ring within the domain.

In another example, the disclosure describes a device including a central processing unit (CPU), a graphics processing unit (GPU). The GPU includes a tessellation unit configured to determine a number of points that reside along a first edge of a first ring within a domain, determine a first set of coordinates for a first portion of the points that reside along the first edge of the first ring within the domain, determine a second set of coordinates for a second portion of the points that reside along the first edge of the first ring within the domain based on the first set of coordinates for the first portion, and stitch one or more points that reside along the first edge of the first ring, based on the first set of coordinates and the second set of coordinates, with points that reside along a second edge of a second ring to divide the domain into a plurality of primitives that are mapped to a patch to increase a resolution of the patch, wherein the second ring is inner to the first ring within the domain.

In another example, the disclosure describes a non-transitory computer-readable medium including instructions that when executed in a sink device cause a programmable processor to determine a number of points that reside along a first edge of a first ring within a domain, determine a first set of coordinates for a first portion of the points that reside along the first edge of the first ring within the domain, and determine a second set of coordinates for a second portion of the points that reside along the first edge of the first ring within the domain based on the first set of coordinates for the first portion, and stitch one or more points that reside along the first edge of the first ring, based on the first set of coordinates and the second set of coordinates, with points that reside along a second edge of a second ring to divide the domain into a plurality of primitives that are mapped to a patch to increase a resolution of the patch, wherein the second ring is inner to the first ring within the domain.

The details of one or more examples are set forth in the accompanying drawings and the description below. Other features, objects, and advantages will be apparent from the description and drawings, and from the claims.

DETAILED DESCRIPTION

Figure 1:
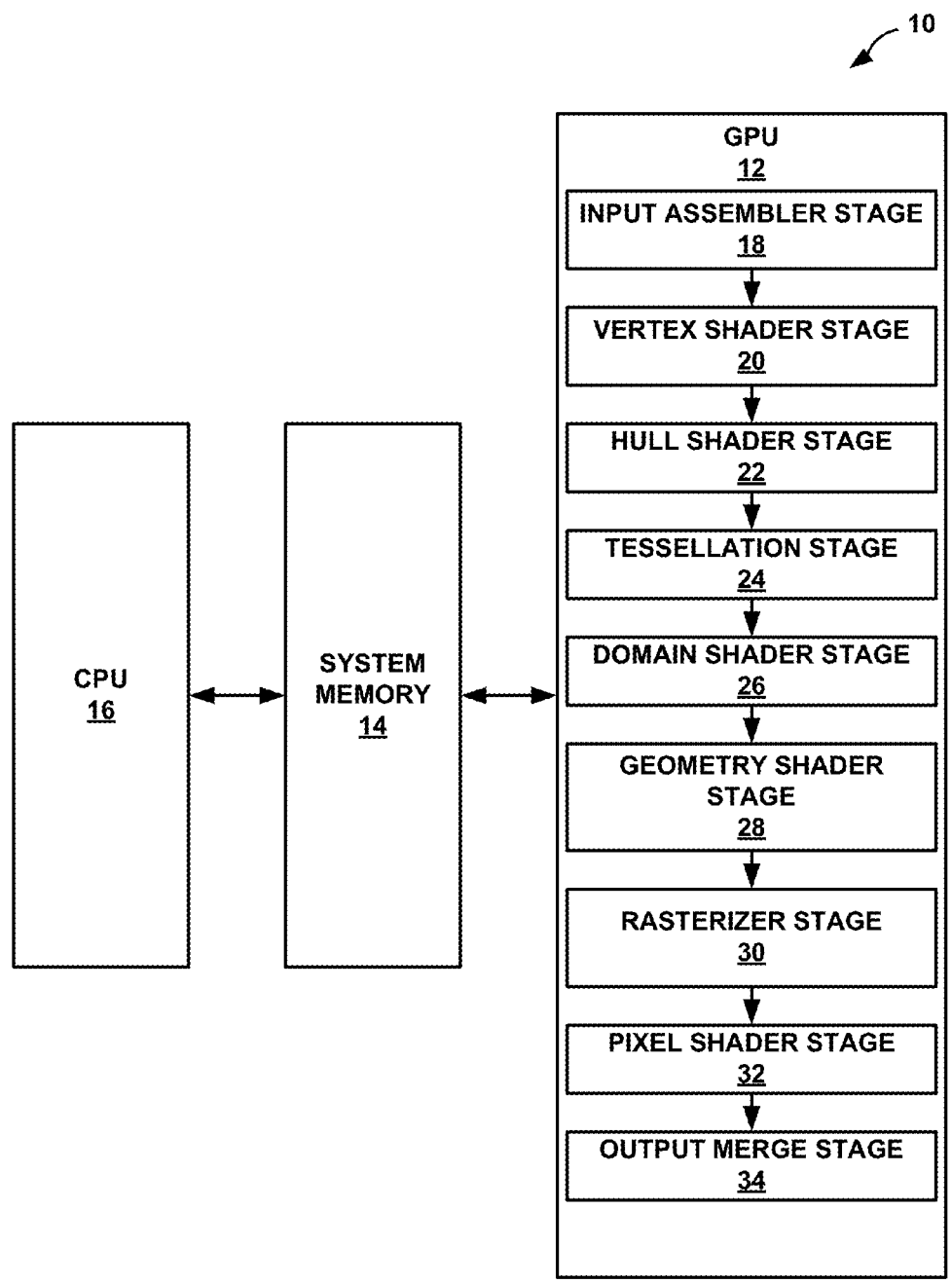
FIG. 1 is a block diagram illustrating an example of a graphics processing unit (GPU) that may implement an example of a graphics processing pipeline in accordance with one or more examples described in this disclosure.

Modern mobile devices, such as laptop computer, tablet computers, smartphones, and digital media players, may include a CPU (Central Processing Unit), a graphics processing unit (GPU) and system memory. When rendering graphics as part of executing an application, the CPU transmits instructions and graphics data to the GPU. In some examples, the graphics data may be in the form of vertices, which may comprise one or more data structures that describes a point in 2D or 3D space.

The application executing on the CPU may communicate with the GPU in accordance with an application programming interface (API). For instance, the application may communicate with the GPU in accordance with the DirectX® API developed by Microsoft® or the OpenGL® API developed by the Khronos Group, as two examples. For purposes of illustration and to ease with understanding, the techniques described in this disclosure are generally described in the context of the DirectX and OpenGL APIs. However, aspects of this disclosure should not be considered limited to the DirectX and OpenGL APIs, and the techniques described in this disclosure may be extended to other APIs as well.

DirectX and OpenGL each define graphics processing pipelines that are to be implemented by a GPU. These graphics processing pipelines may include a combination of programmable stages, as well as fixed-function stages. Some recent versions of the APIs, such as the Direct3D 11 API and the OpenGL 4.x API, include a tessellation process that is to be performed by the GPU.

The tessellation process refers to dividing a portion (referred to as a patch) of a surface of an object into a plurality of smaller portions, and interconnecting the smaller portions together. This results in a more highly detailed surface, as compared to the surface prior to tessellation. Tessellation allows the application executing on the CPU to define the surface with low resolution, which may require few points, and allows the GPU to generate a higher resolution surface.

With tessellation, computation efficiency may be realized because the application executing on the CPU may not need to generate the higher resolution surface, and may instead offload the generation of the higher resolution surface to the GPU. Furthermore, bandwidth efficiency may also be realized because the CPU may need to transmit information for fewer points of the surface because the low resolution surface includes fewer points as compared to the higher resolution surface, and the GPU may need to retrieve fewer points of the surface.

As described above, the GPU applies the tessellation process to a patch. A patch may be considered as a specialized type of a primitive. A patch is defined by one or more control points that together form a portion of a surface. For example, an object, such as a sphere, may be divided into a plurality of surfaces. In this example, the surfaces may be curved surfaces that, when combined, form the sphere. Each one of the surfaces may be divided into one or more patches, where each of the patches is defined by one or more control points.

When dividing an edge into one or more smaller edges, each edge may be normalized to a zero-to-one coordinate system. For example, in a quad domain each of four edges may be normalized from "0" to "1." Accordingly, a normalized quad domain may include Cartesian coordinates (u, v) of (0,0), (1,0), (0,1), (1,1). Similarly, in an example of triangular domain, each of three edges may be normalized from "0" to "1." Accordingly, a normalized triangle domain may have Barycentric coordinates (u, v, w) of (0,0,1), (0,1,0), (1,0,0). Additionally, when using normalized Barycentric coordinates in the triangular domain, the sum of each coordinate set is always one, e.g., for (0,0,1) 0+0+1=1; for (0,1,0) 0+1+0=1; and for (1,0,0) 1+0+0=1. Once an edge has been normalized, the tessellation unit may determine the coordinates of each point of the edge based on the tessellation factor.

The control points may be defined by coordinates (e.g., x and y coordinates for two-dimensional patches or x, y, and z coordinates for three-dimensional patches), and the control points may be considered as vertices of the patch. There may be any number of control points in a patch. For instance, in some examples, the number of control points in a patch may be between one control point up to 32 control points. The number of control points in a patch may be fixed or user defined.

Unlike other primitive types, the control points within the patches may be connected to one another in any way. In other words, there is no predefined way in which the control points of the patches are connected. For example, a standard triangle primitive includes three vertices, and the primitive is defined with a specific way in which the three vertices are connected with one another to form the triangle. The control points, on the other hand, may not need to be connected in any specific way to form a shape. Rather, as one example, some control points in a patch may be connected with one another to form a triangle, other control points in the same patch may be connected with one another to form a rectangle, and yet other control points in the same patch may be connected with one another to form an octagon. As another example, it may be possible that the control points are connected with another to form the same type of shapes as well (e.g., connected to only form a plurality of triangles).

The control points that define a patch of a surface may define a low resolution surface. With the tessellation process, additional detail is added to create a higher resolution surface. For example, referring back to the example of the sphere. If only the control points were used to form the sphere, the sphere would appear jaggy with stair step like points, rather than a smooth curved surface. After tessellation, additional points are added such that when these points are connected, the sphere appears as if it is a smooth sphere.

The tessellation process, in accordance with the both the DirectX API and the OpenGL 4.x API, includes two shaders and a fixed-function unit. A shader is a software application that executes on a programmable shader core of the GPU, and provides substantial functional flexibility. The fixed-function unit is a hardwired logic unit that performs fixed functions, and may not provide functional flexibility. However, it may be possible to implement the functions of the fixed-function unit using a programmable shader coder to provide additional functional flexibility. Solely for purposes of illustration, the functions described in this disclosure for the fixed-function unit are described with a fixed-function unit that provides limited functional flexibility.

In the DirectX API, a graphics processing pipeline that is configured to implement the tessellation process includes a hull-shader stage coupled to a tessellation stage, which is coupled to a domain-shader stage. The hull-shader stage and the domain-shader stage in the DirectX API may form the two shaders of the tessellation process, and the tessellation stage may form the fixed-function unit of the tessellation process. The other stages in the graphics processing pipeline are similar to those in DirectX APIs that do not implement the tessellation process.

In the OpenGL 4.x API, a graphics processing pipeline that is configured to implement the tessellation process includes a tessellation control shader coupled to a primitive generator, which is coupled to a tessellation evaluation shader. The tessellation control shader and the tessellation evaluation shader in OpenGL 4.x may form the two shaders of the tessellation process, and the primitive generator may form the fixed-function unit of the tessellation process. The other stages in the graphics processing pipeline may be similar to those in OpenGL APIs that do not implement the tessellation process.

The techniques described in this disclosure are related generally to the fixed-function unit of the tessellation process (e.g., the tessellation stage of the DirectX graphics processing pipeline and the primitive generator of the OpenGL 4.x graphics processing pipeline). For purposes of brevity, the fixed-function unit of the tessellation process is referred to as a tessellation unit. For instance, examples of the tessellation unit include the tessellation stage of the DirectX graphics processing pipeline, the primitive generator of the OpenGL 4.x graphics processing pipeline, or any other analogous unit for other types of graphics processing pipelines.

As described in more detail, the shader preceding the tessellation unit (e.g., the hull shader stage in DirectX or the tessellation control shader in OpenGL 4.x) transmits values to the tessellation unit that indicate how many primitives are to be generated for the patch to increase the resolution (i.e., increase the detail) of the patch. The shader preceding the tessellation unit also transmits a domain type to the tessellation unit. The tessellation unit divides a domain into the primitives, and indicates the manner in which the primitives in the domain are to be connected (i.e., the manner in which the primitives in the domain are to be stitched).

The domain is a template shape that the tessellation unit divides into a plurality of primitives. It is these primitives that are then added to the patch to increase the resolution of the patch. For example, the additional primitives generated in the domain are then used to form a mesh on the patch, thereby adding detail to the patch.

The shader subsequent to the tessellation unit (e.g., the domain shader in DirectX or the tessellation evaluation shader in OpenGL 4.x) receives the vertices of the primitives generated by the tessellation unit, and connectivity information for the vertices from the tessellation unit. The shader subsequent to the tessellation unit then adds the primitives, as generated by the tessellation unit, to the patch to add more resolution to the surface.

In accordance with techniques described in this disclosure the tessellation unit for graphics processing may be configured to determine coordinates of points along an edge of a ring within the domain based on the other points along the same edge. In this manner, computational efficiency may be achieved because there may be fewer points whose coordinates need to be computed.

For example, the tessellation unit may determine a number of points that reside along a first edge of a first ring within a domain. The tessellation unit may determine a first set of coordinates for a first portion of the points that reside along the first edge of the first ring within the domain, and determine a second set of coordinates for a second portion of the points that reside along the first edge of the first ring within the domain based on the first set of coordinates for the first portion.

The tessellation unit may also be configured to stitch one or more points that reside along the first edge of the first ring, based on the first set of coordinates and the second set of coordinates, with points that reside along a second edge of a second ring to divide the domain into a plurality of primitives that are mapped to a patch to increase a resolution of the patch. In this example, the second ring is inner to the first ring within the domain.

In various examples, the points that reside along the first portion and the points that reside along the second portion may be symmetrical to one another. For example, the second half of the edge is symmetrical with respect to the first half. Accordingly, each point in the first portion of the points is symmetric with a corresponding point in the second portion of the points.

The coordinate for the last point on the edge may be equal to fixed point 1, for reasons described in more detail below. Therefore, if the coordinates for the first portion are generated and represented by the set, X, the coordinate for the points on the second portion are equal to the set, 1−X.

In an example system, the tessellation unit may determine the coordinate for a point of the first portion, and store the coordinate in a buffer. At the same time (e.g., in parallel), the tessellation unit may store the value of one minus the coordinate for the point of the first portion in the buffer or in a different buffer. The value of one minus the coordinate for the point of the first portion may be the coordinate for a point in the second portion. In this example, the point in the second portion may be symmetric to the point in the first portion.

In this manner, the tessellation unit may use a buffer that stores the 1−X values (e.g., the coordinates for the points of the second portion of the edge) when generating the points for the first portion of the edge, which are represented by the set X. When the set 1−X is needed, the values can be read from the buffer in the subsequent clock cycles rather than re-calculating the coordinates for the points along the second portion of the edge.

In this case, various circuitry within the tessellation unit may be clock gated during this period so that this circuitry does not determine the coordinates for the points along the second portion of the edge. This may result in saving significant power because the circuitry that would have been used to determine the coordinates for the points along the second portion of the edge is essentially turned off due to the clock gating.

Additionally, throughput may be increased by using the generated points immediately, instead of waiting to the end until all of the coordinates of the edge are determined to double throughput. For example, in this case, the tessellation unit may determine the coordinates for the points along the first portion and the second portion at the same time. In this example, when the tessellation unit completes determining the coordinate for the last point in the first portion, the coordinates for the points along the first and second portions of the edge are available for processing. In this manner, units further down in the graphics processing pipeline may be able to retrieve the coordinates for all of the points along the edge in half the time, as compared to if the tessellation unit determined the coordinates for each of the points in both the first portion and the second portion one-at-a-time.

FIG. 1 is a block diagram illustrating an example of a graphics processing unit (GPU) that may implement an example of a graphics processing pipeline in accordance with one or more examples described in this disclosure. FIG. 1 illustrates device 10 that includes graphics processing unit (GPU) 12, system memory 14, and central processing unit (CPU) 16. Examples of device 10 include, but are not limited to, mobile wireless telephones, video gaming consoles that include video displays, mobile video conferencing units, laptop computers, desktop computers, television set-top boxes, and the like.

CPU 16 may execute various types of applications. Examples of the applications include web browsers, e-mail applications, spreadsheets, video games, or other applications that generate viewable objects for display. Instructions for execution of the one or more applications may be stored within system memory 14. CPU 16 may transmit graphics data of the generated viewable objects to GPU 12 for further processing.

For example, GPU 12 may be specialized hardware that allows for massive parallel processing, which functions well for processing graphics data. In this way, CPU 16 offloads graphics processing that is better handled by GPU 12. CPU 16 may communicate with GPU 12 in accordance with a particular application processing interface (API). Examples of such APIs include the DirectX® API by Microsoft® and the OpenGL® by the Khronos group; however, aspects of this disclosure are not limited to the DirectX and the OpenGL APIs, and may be extended to other types of APIs that have been developed, are currently being developed, or are to be developed in the future.

Figure 2:
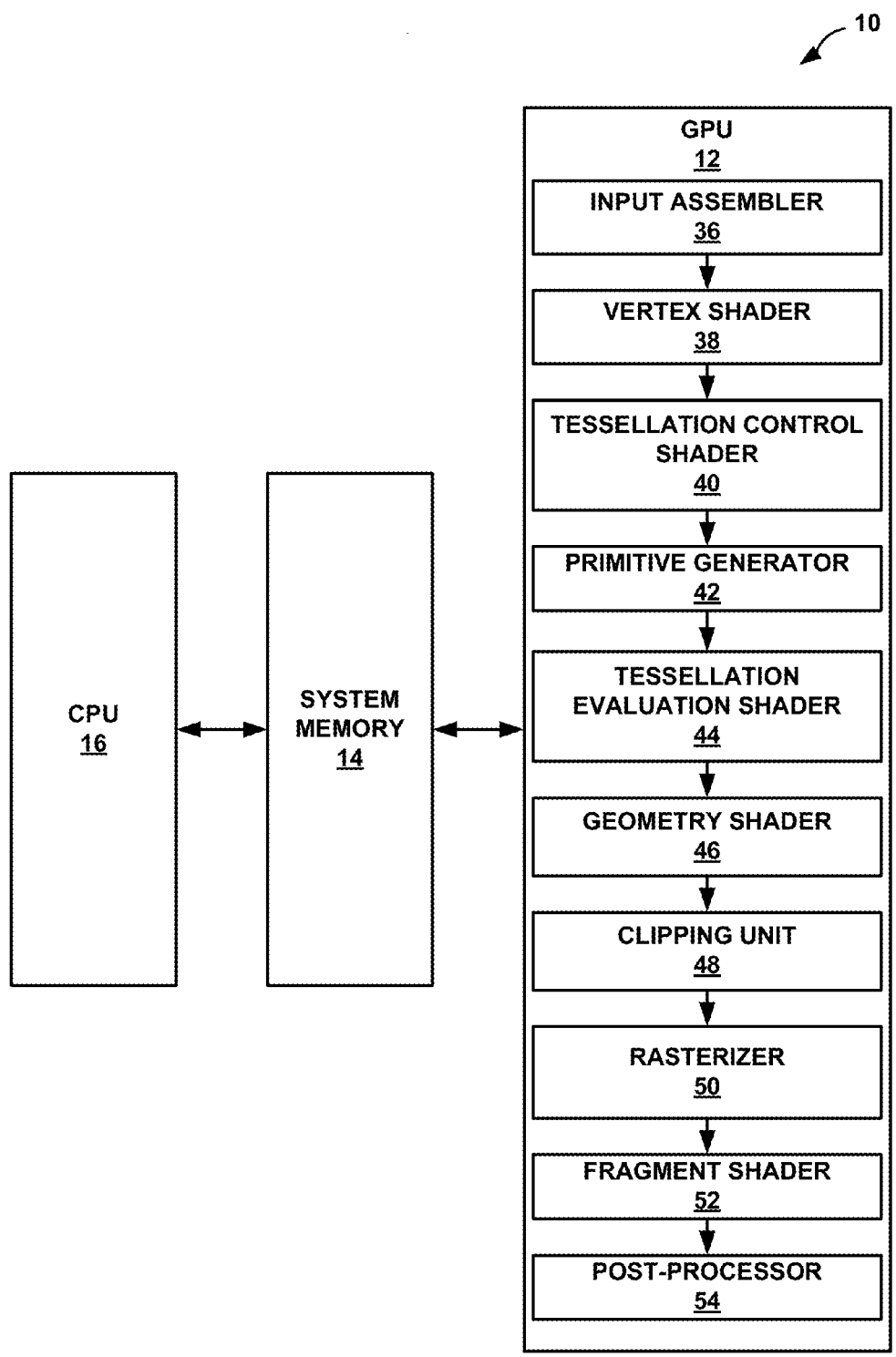
FIG. 2 is a block diagram illustrating another example of a graphics processing unit (GPU) that may implement another example of a graphics processing pipeline in accordance with one or more examples described in this disclosure.

In addition to defining the manner in which GPU 12 is to receive graphics data from CPU 16, the APIs may define a particular graphics processing pipeline that GPU 12 is to implement. GPU 12, in FIG. 1, illustrates the graphics processing pipeline defined by the Direct3D 11 API. As described in more detail, FIG. 2 illustrates the graphics processing pipeline of the OpenGL 4.x API.

Examples of CPU 16 and GPU 12 include, but are not limited to, a digital signal processor (DSP), general purpose microprocessor, application specific integrated circuit (ASIC), field programmable logic array (FPGA), or other equivalent integrated or discrete logic circuitry. In some examples, GPU 12 may be specialized hardware that includes integrated and/or discrete logic circuitry that provides GPU 12 with massive parallel processing capabilities suitable for graphics processing. In some instances, GPU 12 may also include general purpose processing, and may be referred to as a general purpose GPU (GPGPU). The techniques described in this disclosure may also be applicable to examples where GPU 12 is a GPGPU.

System memory 14 may comprise one or more computer-readable storage media. Examples of system memory 14 include, but are not limited to, a random access memory (RAM), a read only memory (ROM), an electrically erasable programmable read-only memory (EEPROM), flash memory, or any other medium that can be used to carry or store desired program code in the form of instructions and/or data structures and that can be accessed by a computer or a processor.

In some aspects, system memory 14 may include instructions that cause CPU 16 and/or GPU 12 to perform the functions ascribed to CPU 16 and GPU 12 in this disclosure. Accordingly, system memory 14 may be a computer-readable storage medium comprising instructions that cause one or more processors, e.g., CPU 16 and GPU 12, to perform various functions.

System memory 14 may, in some examples, be considered as a non-transitory storage medium. The term "non-transitory" may indicate that the storage medium is not embodied in a carrier wave or a propagated signal. However, the term "non-transitory" should not be interpreted to mean that system memory 14 is non-movable. As one example, system memory 14 may be removed from device 10, and moved to another device. As another example, a system memory, substantially similar to system memory 14, may be inserted into device 10. In certain examples, a non-transitory storage medium may store data that can, over time, change (e.g., in RAM).

The execution of the applications on CPU 16 causes CPU 16 to generate a plurality of primitives that connect together to form the viewable content. Examples of the primitives include points, lines, triangles, squares, or any other type of polygon. CPU 16 may define these primitives by their respective vertices. For example, CPU 16 may define coordinates and color values for the vertices. The coordinate values may be three-dimensional (3D) coordinates or 2D coordinates.

In accordance with the techniques described in this disclosure, in some cases, CPU 16 may also generate a special type of primitive referred to as a patch. Similar to the other primitive types, a patch may be defined by a plurality of vertices, referred to as control points of a patch. Unlike other primitive types, the patch may not be any particular shape. For example, CPU 16 may interconnect the control points of the patch in any manner, so that the interconnected control points form any desired shape. For other primitive types such as triangles, CPU 16 may define the specific manner in which the vertices are interconnected (e.g., such that interconnection of the vertices results in a triangle).

Also, unlike other primitive types, the number of control points in a patch may be variable. For example, the application executing on CPU 16 may define a maximum number of control points that are allowed for a patch, or the maximum number of control points may be user-defined. In some examples, the number of control points in a patch may be one to thirty-two control points; however, the techniques described in this disclosure are not so limited.

CPU 16 may utilize the control patch for purposes of tessellation. As described above, a tessellation process refers to CPU 16 defining a portion of a surface of a viewable object in low resolution, and tessellating the portion to generate a higher resolution version of the surface. For example, CPU 16 may define control points of the patch such that when the control points are interconnected the patch forms a portion of a surface of a viewable object. If a surface were to be formed only from the control points of the patch, the surface may not appear with high resolution and may appear jaggy. With tessellation, additional primitives are added to the patch, such that when the primitives are interconnected they add detail to the patch, which increases the resolution of the patch and results in higher quality viewable content.

GPU 12 may be configured to implement tessellation. In this way, CPU 16 may not need to define the vertices for all the additional primitives needed to create the higher resolution patch, which saves on computations performed by CPU 16. Also, CPU 16 may need to transmit fewer vertices (e.g., the vertices of the control points, and not the vertices of the primitives to be added), and GPU 12 may correspondingly need to receive fewer vertices, which promotes bandwidth efficiency due to fewer accesses to system memory 14.

To perform graphics operations, GPU 12 may implement a graphics processing pipeline. The graphics processing pipeline includes performing functions as defined by software or firmware executing on GPU 12 and performing functions by fixed-function units that are hardwired to perform very specific functions. The software or firmware executing on the GPU 12 may be referred to as shaders, and the shaders may execute on one or more shader cores of GPU 12. Shaders provide users with functional flexibility because a user can design the shaders to perform desired tasks in any conceivable manner. The fixed-function units, however, are hardwired for the manner in which the fixed-function units perform tasks. Accordingly, the fixed-function units may not provide much functional flexibility.

As indicated above, the graphics processing pipeline illustrated in FIG. 1 is a graphic processing pipeline substantially as defined by Direct3D 11. In this example, GPU 12 may include one or more of input assembler stage 18, vertex shader stage 20, hull shader stage 22, tessellation stage 24, domain shader stage 26, geometry shader stage 28, rasterizer stage 30, pixel shader stage 32, and output merge stage 34. GPU 12 may include more stages than those illustrated, and in some examples, GPU 12 may not necessarily include all of the illustrated stages. Also, the specific ordering of the stages is provided for purposes of illustration and should not be considered limiting.

In techniques described in this disclosure, CPU 16 may output the control points of a patch to system memory 14. GPU 12 may then retrieve the control points from system memory 14. In this manner, CPU 16 may transmit the control points to GPU 12. As used in this disclosure, CPU 16 transmitting to GPU 12, or GPU 12 receiving from CPU 16 may generally include CPU 16 writing to system memory 14, from which GPU 12 receives. Alternatively, it may be possible for CPU 16 to directly transmit to GPU 12, and for GPU 12 to directly receive from CPU 16.

Input assembler stage 18 may read the control points from system memory 14 as defined by CPU 16, and assemble the control points to form the patch. For instance, input assembler stage 18 may read the coordinates, color values, and other such information of the control points. The coordinates, color values, and other such information may be commonly referred to as attributes of the control points. Based on the attributes of the control points, input assembler stage 18 may determine the general layout of the patch. In this manner, input assembler stage 18 may assemble the control points to form the patch. Input assembler stage 18 may be a fixed-function unit.

Vertex shader stage 20 may process the vertices (e.g., the control points of the patch) from input assembler stage 18. For example, vertex shader stage 20 may perform per-vertex operations such as transformations, skinning, morphing, and per-vertex lighting. Vertex shader stage 20 may be a shader.

Hull shader stage 22 receives the control points of the patch, as processed by vertex shader stage 20, process the control points, and outputs control points for a processed patch. In other words, hull shader stage 22 receives an input patch, as processed by vertex shader stage 20, processes the input patch, and outputs an output patch. Hull shader stage 22 may perform various functions for processing the input patch. For example, hull shader stage 22 may modify the coordinates of the control points to change the locations of the control points, or may even add or delete control points.

In addition, hull shader stage 22 may determine values that indicate how many primitives are to be added to the patch generated by hull shader stage 22 (i.e., the output patch). Hull shader stage 22 may utilize various criteria to determine how many primitives are to be added to the patch. Described below are two example criteria that hull shader stage 22 may utilize to determine how many primitives are to be added to the patch. However, aspects of this disclosure are not so limited, and hull shader stage 22 may utilize any criteria to determine how many primitives should be added to the patch.

As one example, hull shader stage 22 may utilize information indicative of the depth of the patch to determine how many primitives should be added. For instance, a patch that is further away, from the perspective of the viewer, may not need high resolution because objects further in distance appear blurry in real life. However, a patch that is closer, from the perspective of the viewer, may need higher resolution because objects closer in distance appear sharper in real life. In this example, hull shader stage 22 may determine that fewer primitives should be added to the patch that is further away, and more primitives should be added to the patch that is closer, relative to one another.

As another example, hull shader stage 22 may determine how many primitives should be added based on the size of the patch. For a smaller sized patch, hull shader stage 22 may determine that fewer primitives should be added because the patch encompasses a smaller area. For a larger sized patch, hull shader stage 22 may determine that more primitives should be added because the patch encompasses a larger area.

Based on a determination of how many primitives should be added, hull shader stage 22 may output a domain type and values that indicate how many primitives are to be added to the patch to tessellation stage 24. The values that indicate how many primitives are to be added to the patch, in the Direct3D 11 API, are referred to as tessfactors.

The domain may be a considered as a template shape that tessellation stage 24 uses for tessellation purposes. Examples of the domain type include a line, a triangle, a quad (e.g., a four sided polygon), or any other type of polygon. The domain may be a two-dimensional (2D) shape, even if the patches define a three-dimensional (3D) surface or a 2D surface. When the domain is a line, the domain may be a one-dimensional (1D) shape (i.e., a line), even if the patches define a 3D surface, a 2D surface, or a 1D surface. For purposes of illustration, the techniques described in this disclosure are described with respect to the domain being a 2D surface. For instance, the techniques are described with domain shapes that are the triangle or quad.

In some examples, hull shader stage 22 may not explicitly indicate the domain type. Rather, tessellation stage 24 may determine the domain type based on the number of transmitted tessfactors. For example, the presence of four tessfactors may indicate that the domain type is a triangle domain type, and the presence of six tessfactors may indicate that the domain type is a quad domain type.

In some examples, a quad domain may be defined by 2D Cartesian coordinates (u, v). In some examples, a triangle domain may be defined by Barycentric coordinates. Barycentric coordinates utilize three coordinates to identify any point within the triangle. For example, the vertices of the triangle domain may be defined as (u, v, w), as described below in more detail. The location of any point within the triangle is defined by vertex weighting that indicates its proximity to a vertex. For instance, the closer a point is to a vertex, the higher its vertex weighting, and the further away the point is from the vertex, the lower its vertex weighting.

As an example, assume the vertices of the triangle are defined with Barycentric coordinates (u, v, w) as follows: (1, 0, 0), (0, 1, 0), and (0, 0, 1). In this example, the center point is located at (⅓, ⅓, ⅓) because the center point is equally distant from each of the vertices. Also, with the given definition of the vertex coordinates, in this example, the sum of the u, v, and w coordinates for any point within the triangle domain should equal one.

The Cartesian and Barycentric coordinates are described for purposes of illustration only, and should not be considered limiting. In other examples, it may be possible to define the quad domain with Barycentric coordinates or Cartesian coordinates, and the triangle domain with Cartesian coordinates or Barycentric coordinates. In general, a domain, of any type, may be defined using any coordinate system.

Tessellation stage 24 may tessellate (e.g., divide) the domain into a plurality of primitives. It should be understood that, in this example, tessellation stage 24 is not dividing the patch outputted by hull shader stage 22 into primitives, but rather dividing the domain into the primitives. In some examples, tessellation stage 24 may not even have access to the patch outputted by hull shader stage 22. Tessellation stage 24 may be a fixed-function unit, although aspects of this disclosure need not be so limited.

Tessellation stage 24 may utilize the tessfactors outputted by hull shader stage 22 to tessellate (e.g., divide) the domain into a plurality of primitives. For example, in addition to defining the domain type (e.g., triangle or quad) the tessfactors may define how many rings are to be included within the domain.

A ring may be a series of concentric shapes within the domain, where the concentric shapes are the same shape as the domain shape. For example, if the domain shape is a quad, the perimeter of the quad may be considered as the outer ring. Hull shader stage 22 may define the number of inner rings, which may be series of smaller sized quads that reside within the quad domain. Similarly, if the domain shape is a triangle, the perimeter of the triangle may be considered as the outer ring, and the inner rings may be series of smaller sized triangles that reside within the triangle domain.

In addition to defining the number of rings within a domain, the tessfactors define the points that reside along the rings. The points that reside along the rings should not be confused with control points. The control points define the patch. The points that reside along the rings are points generated by tessellation stage 24 based on the tessfactors. These points are generated within the domain, and not within the patch.

Also, it is these points that tessellation stage 24 connects together to divide the domain into a plurality of primitives. For example, assume that the primitives that tessellation stage 24 will divide the domain into are triangles. In this example, tessellation stage 24 may connect one point that resides along the outer ring, with two points that reside along the inner ring to form a triangle primitive. Alternatively, tessellation stage 24 may connect two points that reside along the outer ring with one point that resides along the inner ring to form a triangle primitive. In this way, by defining the domain type, the number of rings within the domain, and the number of points along the outer and inner rings, hull shader stage 22 may define the number of primitives into which tessellation stage 24 should divide the domain.

In some examples, the number of points that can reside along an edge of ring may be one point to sixty-five points. For example, if the domain type is a triangle, than there may be up to 65 points per edge of the triangle domain. Similarly, if the domain type is a quad, than there may be up to 65 points per edge of the quad. However, the techniques described in this disclosure are not limited to an edge having a maximum of sixty-five points.

Furthermore, the number of points that reside along a ring may be different for outer and inner rings. For example, the number of points that reside along an edge of the outer ring may be more than or less than the number points that reside along an edge of the inner ring. It may also be possible that number of points that reside along the edge of the outer ring and the inner ring are the same number of points.

Moreover, the number points along an edge of the same ring may be different. For example, for a triangle domain, the number of points that reside along one of the edges may be different than the number of points that reside along one other edge, or both edges. Similarly, for a quad domain, the number of points that reside along one of the edges may be different than the number of points that reside along one, two, or all three other, remaining edges. It may also be possible for each of the edges of the rings to have the same number of points.

As described above, in some examples, tessellation stage 24 may not divide the patch into a plurality of primitives. Accordingly, in some examples, tessellation stage 24 may not receive any information such as the number of control points, the locations of the control points, or the size of the patch. Without any information as to the size of the patch and the locations of the control points, tessellation stage 24 may not be able to define the size of the domain that is used or the specific coordinates for the vertices of the domain.

To address this, tessellation stage 24 may rely upon a normalized coordinate system for defining the vertices of the domain, as well as for determining the locations of the interconnected points within the domain. In a quad domain each of four edges may be normalized from "0" to "1." As one example of the normalized coordinates, tessellation stage 24 may define the vertices of a quad domain, in u, v coordinates, as: (0, 0), (1, 0), (0, 1), and (1, 1), which is a unit square. Similarly, in a triangular domain, each of three edges may be normalized from "0" to "1." Accordingly, tessellation stage 24 may define the vertices of a triangle domain, in u, v, w coordinates, as: (0, 0, 1), (0, 1, 0), and (1, 0, 0), which is an equilateral triangle. Tessellation stage 24 may determine the coordinates for the interconnected vertices of the plurality of primitives in this normalized coordinate system. Additionally, when using normalized Barycentric coordinates in the triangular domain, the sum of each coordinate set is always one.

Tessellation stage 24 may output the vertices of the plurality of primitives of the domain to domain shader stage 26 in the normalized coordinate system (e.g., the u, v coordinates or the u, v, w coordinates, as applicable). The function of domain shader stage 26 may be to map the vertex coordinates, as received from tessellation stage 24, on to the patch. For example, while tessellation stage 24 may not receive information of the patch as defined by hull shader stage 22, domain shader stage 26 may receive such information from hull shader stage 22.

Domain shader stage 26 may execute for each vertex coordinate outputted by tessellation stage 24. With the coordinates of the control points of the patch from hull shader stage 22, domain shader stage 26 may determine the location of the vertex, as outputted by tessellation stage 24, on the patch. Because tessellation stage 24 outputs vertices of the plurality of primitives generated by tessellation stage 24, and domain shader stage 26 adds these primitives to the patch, the combination of hull shader stage 22, tessellation stage 24, and domain shader stage 26 together add additional primitives to the patch. This results in a mesh of primitives that are added to the patch creating a higher resolution, more detailed patch, as compared to the patch defined by CPU 16. In this manner, hull shader stage 22, tessellation stage 24, and domain shader stage 26 implement a tessellation process.

The tessellation stage 24 may be configured to include a point generator capable of outputting two x-y coordinate pairs simultaneously. Point generator may transmit the x-y coordinate pairs for both points to a connectivity generator in parallel. In some examples, the connectivity generator may be configured to receive two x-y coordinate points at a time. In the case where connectivity generator is capable of receiving two x-y coordinate pairs simultaneously, the tessellation unit may include two 4-deep first-in-first-out (FIFO) queues (that is, two FIFOs capable of holding 4 x-y coordinate pairs). For example, the tessellation unit, the local memory of GPU 12, or system memory 16 may include two buffers 88, where each of the two buffers 88 is a 4-deep FIFO queue.

Geometry shader stage 28 receives the vertices of the primitives added to the patch by domain shader stage 26 and may further generate additional vertices for the primitives to add even more resolution. Rasterizer stage 30 receives the primitives from geometry shader stage 28 and converts the primitives into pixels for the display. For example, the primitives may be defined as vectors that indicate the interconnection of the primitives, and may be defined in a coordinate space that is independent of the display on which the image is to be displayed. Rasterizer stage 30 converts these vectors into the display coordinates, and performs any additional functions such as removing points within primitives that are occluded.

Pixel shader stage 32 receives the pixels as outputted by rasterizer stage 30 and performs post processing to assign color values to each of the pixels that are to be displayed. For example, pixel shader stage 32 may receive constant values stored in system memory 14, texture data stored in system memory 14, and any other data to generate per-pixel outputs such as color values. Pixel shader stage 32 may also output opacity values that indicate the opaqueness of the pixels.

Output merge stage 34 may perform any final pixel processing. For example, output merge stage 34 may utilize depth information to further determine whether any of the pixels should be removed from being displayed. Output merge stage 34 may also perform blending operations to generate final pixel values.

Output merge stage 34 may output the final pixel values to a frame buffer, generally located within system memory 14, but which may be located within GPU 12. A display processor (not shown) may retrieve the pixel values from the frame buffer and cause pixels of a display (not shown) of device 10 to illuminate accordingly to the pixel values to cause the display to display the image.

As described above, tessellation stage 24 interconnects points of the outer and inner rings within the domain to generate a plurality of primitives within the domain. In an example, the tessellation stage 24 may be a tessellation unit for graphics processing. The tessellation unit may be configured to determine a number of points that reside along a first edge of a first ring within a domain. Additionally, the tessellation unit may also be configured to determine a first set of coordinates for a first portion of the points that reside along the first edge of the first ring within the domain. The tessellation unit may also be configured to determine a second set of coordinates for a second portion of the points that reside along the first edge of the first ring within the domain based on the first set of coordinates for the first portion. In an example, the tessellation unit may be configured to determine the second set of coordinates for the second portion of the points based on only the first set of coordinates for the first portion of the points.

In an example, the tessellation unit may be configured to stitch one or more points that reside along the first edge of the first ring with points that reside along a second edge of a second ring. This may be done to divide the domain into a plurality of primitives that are mapped to a patch to increase a resolution of the patch. This division may be based on the first set of coordinates and the second set of coordinates of the edge. In this example, the second ring is inner to the first ring within the domain. For example, the points along the edge (i.e., the points of the first portion and the points of the second portion) may form the vertices of the primitives. The tessellation unit may stitch these points of the edge with points along an edge of an inner ring. The stitching of these points may result in primitives that are mapped to the patch to increase the resolution of the patch.

In accordance with techniques described in this disclosure, as described above, the first unit may determine coordinates for points along a second portion based on the determined coordinates for points along a first portion, and in some examples, based only on the points along the first portion. The techniques described this disclosure may allow for such determination of the coordinates of the second portion of the edge due to the symmetry between the points in the first and second portions.

Symmetry, as used in this disclosure, may refer to the condition that the points along the first portion appear as mirror points to the points along the second portion. In other words, for a point in the first portion there is a mirror point in the second portion. This mirror point in the second portion may be considered as being symmetric to the point in the first portion.

For example, assume that the first portion and the second portion are each half of the edge. In this example, the first portion may be referred to as the first half of the edge, and the second portion may be referred to as a second half of the edge. For instance, the first half of the edge may start from a first end of the edge and end halfway up the edge. The second half of the edge may start halfway up the edge and end at a second end of the edge.

In this case, assume that the length of the edge is one unit, and that there is a point in the first half that is a distance D from the first end. In this example, due to the symmetry, there is a point in the second half that is a distance D from the second end. The point in the first half that is a distance D from the first end is considered to the mirror of the point that is a distance D from the second end. In other words, each of these points in the first portion and the second portion are equidistant from the halfway point of the edge.

The tessellation unit may exploit this symmetry for purposes of determining coordinates of the edge. For example, the coordinates of the points along the edge may be based on a normalized coordinate system in which the length of the edge is assigned to be one. In this case, the first end of the edge may be represented with the coordinate value of 0, and the second end of the edge may be represented with the coordinate value of 1.

Accordingly, keeping with the previous example, a point that is a distance D away from the first end has a symmetric point that is a distance D away from the second end. If the coordinate of the point that is a distance D away from the first end is defined as "D," then the coordinate of its symmetric point is 1-D because the ends of the edge are at 0 and 1. This symmetry may allow the tessellation unit to determine the coordinate for one of the points in the first portion, and determine the coordinate for its symmetric point in the second portion based on the determined coordinates for the point in the first portion. For example, the tessellation unit may determine the coordinate for one point in the first half to be D, and determine the coordinate for its symmetric point in the second half to be 1-D.

To expand this concept, consider that a first set of coordinates are represented by X, where X represents the coordinates for the points in the first portion edge, which may be half of the edge. In this example, the tessellation unit may determine the coordinates for the points in the second portion as being 1−X, where 1−X represents the coordinates for the points in the second portion of the edge.

Due to this symmetric relationship, the tessellation unit may be able to determine the coordinates of a point in the first portion and coordinates of a point in the second portion at same time (e.g., in parallel). For example, upon determining the coordinates of a point in the first portion, the tessellation unit may store the coordinates in a buffer. At the same time, or shortly thereafter, the tessellation unit may also be able to store the coordinates for a point in the second portion by subtracting the coordinates of the point in the first portion from one to determine the coordinates of the point in the second portion. The tessellation unit may store the coordinates for the point in the second portion in the same buffer or a different buffer.

In this manner, the tessellation unit may not need to waste computing cycles using complicated arithmetic to determine the coordinates of each of the points along the edge. Rather, the tessellation unit may determine a first set of coordinate for points along a first portion of the edge, and apply the simple arithmetic of subtraction the first set of coordinates from one to determine a second set of coordinates for points along a second portion of the edge. Also, due to this simple arithmetic, the tessellation unit may be able to determine the second set of coordinates at a time substantially the same as the time when the tessellation unit determined the first set of coordinates. This may allow the tessellation unit to output the first and second set of coordinates at substantially the same time, rather than outputting each of the coordinates of the points along the edge one-at-a-time.

FIG. 2 is a block diagram illustrating another example of a graphics processing unit (GPU) that may implement another example of a graphics processing pipeline in accordance with one or more examples described in this disclosure. For instance, FIG. 1 illustrated a graphics processing pipeline formulated substantially in accordance with the Direct3D 11 API. FIG. 1 illustrates the graphics processing pipeline substantially in accordance with the OpenGL 4.x API.

The OpenGL 4.x graphics processing pipeline may function in a substantially similar fashion as the Direct3D 11 graphics processing pipeline. Accordingly, for purposes of brevity, reference is made to FIG. 1 to describe components that are similar to both the Direct3D 11 graphics processing pipeline and the OpenGL 4.x graphics processing pipeline.

As illustrated in the example of FIG. 2, GPU 12 includes input assembler 36, vertex shader 38, tessellation control shader 40, primitive generator 42, tessellation evaluation shader 44, geometry shader 46, clipping unit 48, rasterizer 50, fragment shader 52, and post-processor 54. Similar to FIG. 1, in the example illustrated in FIG. 2, GPU 12 may include more or fewer components than those illustrated in FIG. 2. Also, the specific ordering of the unit is provided for purposes of illustration and should not be considered limiting.

In some ways, the tessellation process with the OpenGL 4.x graphics processing pipeline may be substantially similar to the tessellation process with the Direct3D 11 graphics processing pipeline. For example, OpenGL 4.x tessellation process may rely upon patches and control points, in the manner similar to that described above with respect to FIG. 1.

For instance, input assembler 36 and vertex shader 38 of FIG. 2 may function substantially similar as input assembler stage 18 and vertex shader stage 20 of FIG. 1, respectively.

For example, in FIG. 2 primitive generator 42 may be equivalent or comparable to a tessellation unit. The tessellation unit may determine a number of points that reside along a first edge of a first ring within a domain. Additionally, the tessellation unit may determine a first set of coordinates for a first portion of the points that reside along the first edge of the first ring within the domain. The tessellation unit may also determine a second set of coordinates for a second portion of the points that reside along the first edge of the first ring within the domain based on the first set of coordinates for the first portion. The tessellation unit may also be configured to stitch points that reside along the first edge of the first ring with points that reside along a second edge of a second ring to divide the domain into a plurality of primitives that are mapped to a patch.

As more examples, for tessellation, tessellation control shader 40 of FIG. 2 may function substantially similarly to hull shader stage 22 of FIG. 1. However, tessellation control shader 40 outputs tessellation levels, which may be analogous to the tessfactors of Direct3D 11. For example, the tessellation levels of OpenGL 4.x may define the domain type, the number of rings within the domain, and the number of points per ring edge.

Primitive generator 42 may function in a substantially similar manner as tessellation stage 24. For example, primitive generator 42 may utilize the tessellation levels and the domain type to divide the domain into a plurality of primitives.

Tessellation evaluation shader 44 of FIG. 2 may function substantially similarly to domain shader stage 26 of FIG. 1. For example, tessellation evaluation shader 44 may receive the vertices of the generated primitives from primitive generator 42 and add the primitive to the patch outputted by tessellation control shader 40. In this manner, the graphics processing pipeline of the OpenGL 4.x API may perform tessellation on a patch to increase the resolution of the patch.

Geometry shader 46 may function substantially similar to geometry shader stage 28. The combination of clipping unit 48 and rasterizer 50, in FIG. 2, may function substantially similarly to rasterizer stage 30 in FIG. 1. Fragment shader 52 and post-processor 54 in FIG. 2 may function substantially similar to pixel shader stage 32 and output merge stage 34 in FIG. 1, respectively. Post-processor 54 may output the final pixel values to a frame buffer and the display processor may retrieve the pixel values from the frame buffer and cause a display to illuminate according to the pixel values to display the image.

As described above, tessellation control shader 40, primitive generator 42, and tessellation evaluation shader 44 of FIG. 2 function substantially similar to hull shader stage 22, tessellation stage 24, and domain shader stage 26 of FIG. 1, respectively, for implementing the tessellation process. Accordingly, both the Direct3D 11 and the OpenGL 4.x APIs rely upon two programmable shader units and one fixed-function unit to implement the tessellation process.

For purposes of generality, the techniques described in this disclosure may be described with a first tessellation shader unit, a tessellation unit, and a second tessellation shader unit. Examples of the first tessellation shader unit include hull shader stage 22 and tessellation control shader 40. Examples of the tessellation unit include tessellation stage 24 and primitive generator 42. Examples of the second tessellation shader unit include domain shader stage 26 and tessellation evaluation shader 44.

Also, Direct3D 11 uses the term "tessfactors" and OpenGL 4.x uses the term "tessellation levels," which may be considered analogous terms. For purposes of generality, this disclosure uses the term "tessellation factor," examples of which include tessfactors and tessellation levels. In this way, the first shader unit may be considered as outputting tessellation factors to the tessellation unit, and the tessellation unit may output vertices to the second shader unit in response to the tessellation factors.

It should be noted that while the Direct3D 11 and OpenGL 4.x utilize two shader units and one fixed-function unit, the techniques described in this disclosure are not so limited. For example, it may be possible in other systems for the first and second shader units to be fixed-function units and the tessellation unit to be a shader unit. As another example, all may be fixed-function units or all may be shader units, or any combination thereof.

Therefore, in some examples, it may be considered that a first unit performs functions similar to the first shader unit, but may be a shader unit or a fixed-function unit, a second unit performs functions similar to the tessellation unit, but may be a shader unit or a fixed-function unit, and a third unit performs functions similar to the second shader unit, but may be a shader unit or a fixed-function unit. Moreover, although the first shader unit, the tessellation unit, and the second shader unit are illustrated as separate units in FIGS. 1 and 2, aspects of this disclosure are not so limited. These units, and possibly any unit of the graphics processing pipelines illustrated in FIGS. 1 and 2, may be combined together into a common unit. Accordingly, while the functionality of these units is described separately for ease of description, these units may be implemented in shared hardware or as distinct components.

Figure 3A:
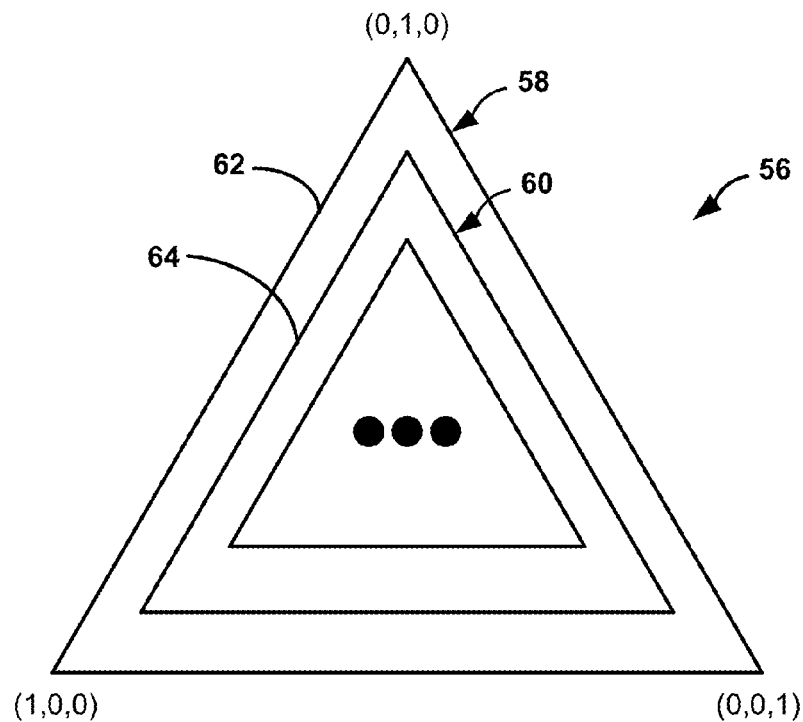
FIGS. 3A and 3B are graphical diagrams illustrating examples of domain types that include a plurality of inner rings for stitching in accordance with one or more examples described in this disclosure.
Figure 3B:
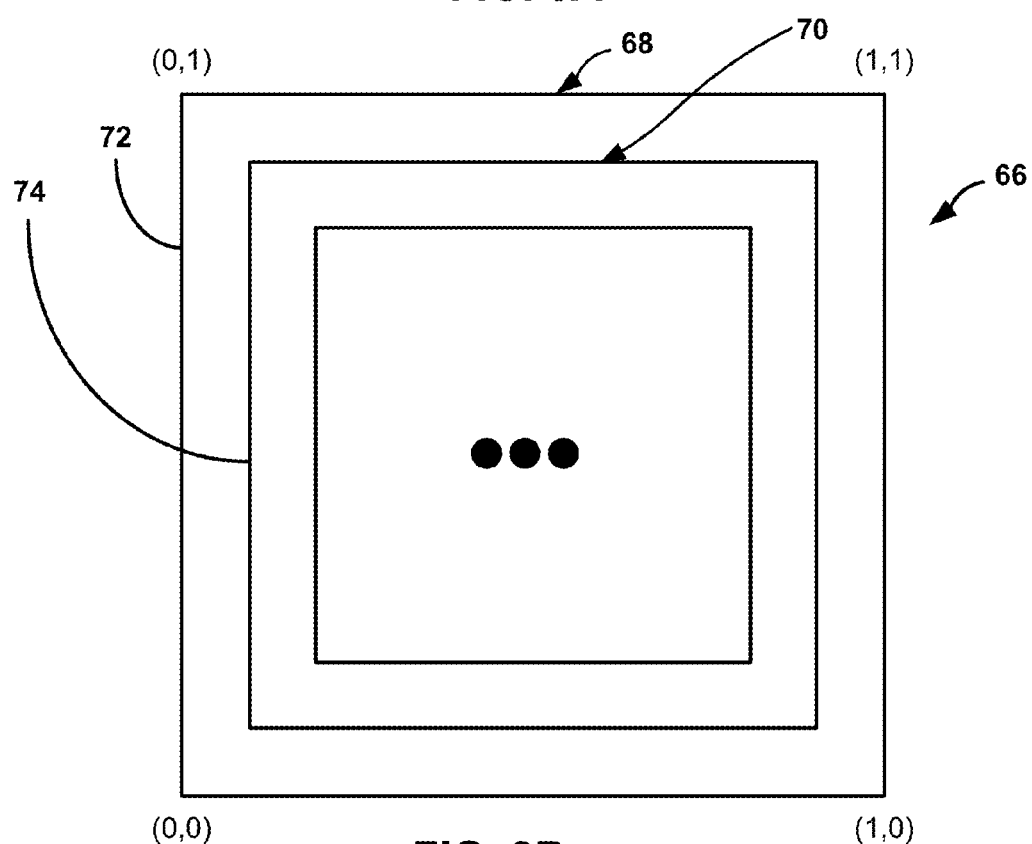

FIGS. 3A and 3B are graphical diagrams illustrating examples of domain types that include a plurality of inner rings in accordance with one or more examples described in this disclosure. For example, FIG. 3A illustrates triangle domain 56 and FIG. 3B illustrates quad domain 66. As illustrated, triangle domain 56 and quad domain 66 each include concentric triangles and squares, respectively.

In FIG. 3A, triangle domain 56 includes outer ring 58 and inner ring 60. Outer ring 58 includes outer ring edge 62, and inner ring 60 includes inner ring edge 64. Outer ring edge 62 and inner ring edge 64 are parallel with one another. In aspects described in this disclosure, the tessellation unit may use symmetry between the first and the second set of coordinates to potentially decrease calculating resources used to calculate the coordinates. For example, the tessellation factors may define the number of points that reside along outer ring edge 62 and the number of points that reside along inner ring edge 64. As indicated in FIG. 3A, there is an addition inner ring, which is inner to inner ring edge 64. The tessellation unit may determine the first set of coordinates for a first portion of a particular edge (e.g., outer ring edge 62) to be a set of values X. The tessellation unit may determine the second set of coordinates for a second portion of the same edge (e.g., outer ring edge 62) to be 1−X based on the symmetry between the first and the second set of coordinates.

In an example using normalized coordinates, a tessellation unit such as tessellation stage 24 from FIG. 1 or primitive generator 42 from FIG. 2 may determine the coordinates for a portion of an edge and use the symmetry to determine the other portion. The coordinates may be normalized. With normalized coordinates the ends are assumed be at 0 and at 1. For example, in a normalized quad domain each of four edges may be normalized from "0" to "1" and may include Cartesian coordinates (0,0), (1,0), (0,1), (1,1) and in a normalized triangle domain each of three edges may be normalized from "0" to "1" and may have Barycentric coordinates (0,0,1), (0,1,0), (1,0,0). Additionally, as discussed above, when using normalized Barycentric coordinates in the triangular domain, the sum of each coordinate set is always one.

In particular, the tessellation unit may utilize the formula:

$$1-X(n)$$

to determine the coordinates for the other portion. In this example, X(n) represents one of the coordinates, and "n" is an integer value indicative of the number of points along a portion of an edge.

In one specific example used simply for purposes of illustration, it may be assumed that the tessellation factors define that there are 10 points along an edge. It may also be assumed that the first portion and the second portion of the edge each include half of the points. Therefore, there are 5 points per portion.

In this example, the tessellation unit may determine the coordinates for 5 points (i.e., n=1 to 5), for the other remaining points (i.e., the remaining 5 points), the tessellation unit may reuse the 5 points for the first portion. For instance, the tessellation unit may implement the equation 1−X(n), where n=1 to 5. In this equation, 1−X(n) represent the coordinates for points 6 through 10 on the edge.

The above equations may be generalized to X(N−n) equals 1−X(n), where N is the total number of points on an edge, and "n" ranges from 1 to the number of points in the first portion. Accordingly, in this case X(N−n) represents the coordinates for the points in the second portion, and X(n) represents the coordinates for the points in the first portion. In this way, the tessellation unit may be able to determine the second set of coordinates based on the determined first set of coordinates.

This allows the tessellation unit to perform fewer tasks to determine the coordinates of the points. It will be understood, however, that other numbers of points along the edge may be used (e.g., other than 10 points). Generally, the more points that are used, the greater the detail that may be provided.

FIG. 3B is similar to FIG. 3A but with a quad domain. Similar to the triangle domain illustrated in FIG. 3A, the tessellation unit may determine the points along the edge of the quad domain utilizing the X(N−n) equals 1−X(n) techniques described above. For example, FIG. 3B illustrates quad domain 66. Quad domain 66 includes outer ring 68 and inner ring 70. Outer ring 68 includes outer ring edge 72, and inner ring 70 includes inner ring edge 74. The tessellation unit may determine the points along the edges such as those of outer ring edge 72 in a manner similar to that described above. For example, the tessellation unit may determine coordinates for points that reside along a first portion of outer ring edge 72, and determine coordinates for points that reside along a second portion of outer ring edge 72 based on the coordinates for the points that reside along the first portion.

Figure 4A:
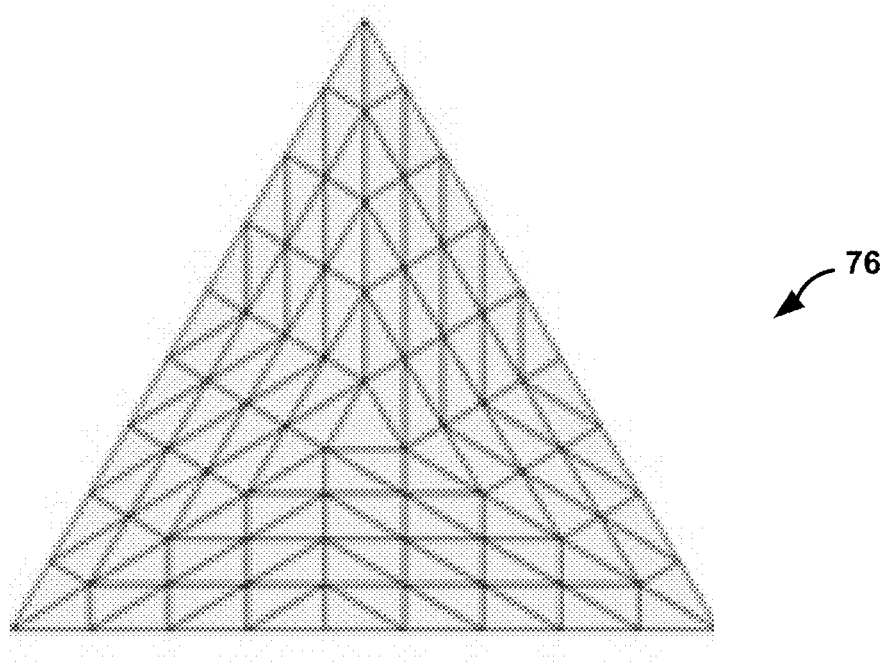
FIGS. 4A and 4B are graphical diagrams illustrating a domain divided into a plurality of primitives in accordance with one or more examples described in this disclosure.
Figure 4B:
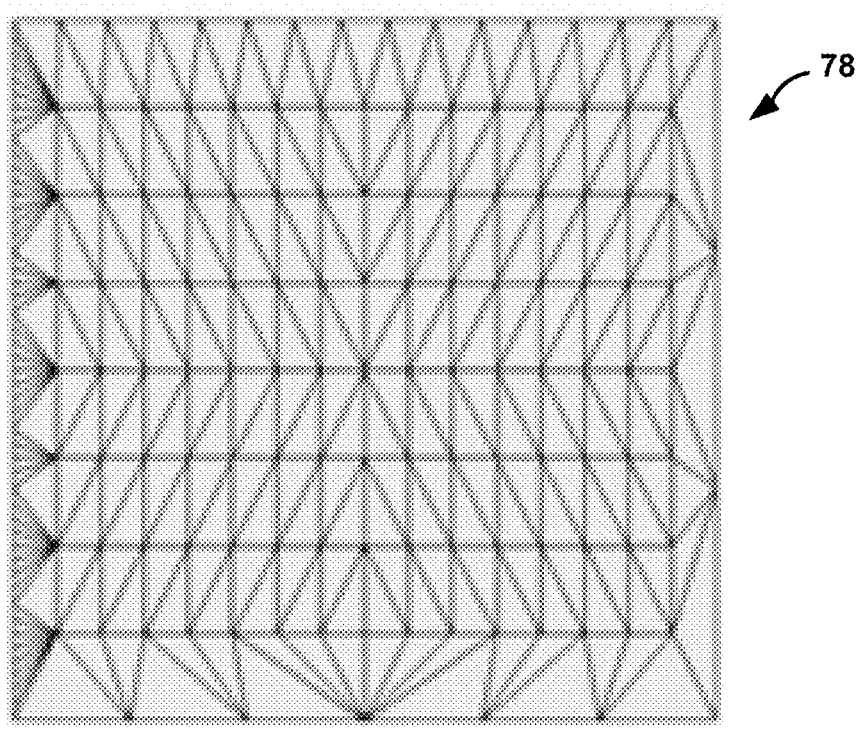

FIGS. 4A and 4B are graphical diagrams illustrating a domain divided into a plurality of primitives in accordance with one or more examples described in this disclosure. For example, FIG. 4A illustrates triangle domain 76 divided (i.e., tessellated) into a plurality of primitives, and FIG. 4B illustrates quad domain 78 divided into a plurality of primitives.

In FIGS. 4A and 4B, the interconnection of the points that form the triangle may be based on the tessellation factors. For example, the tessellation units described above may includes a first unit that determines a number of points that reside along a first edge of a first ring within a domain such as the edges of the triangle domain 76 of FIG. 4A and the quad domain 78 divided illustrated in FIG. 4B. As illustrated in FIGS. 4A and 4B the domains may be divided (i.e., tessellated) into a plurality of primitives.

The tessellation units described above may also determine a first set of coordinates for a first portion of the points that reside along the first edge of the first ring within the domain and determine a second set of coordinates for a second portion of the points that reside along the first edge of the first ring within the domain based on the first set of coordinates for the first portion. As illustrated in FIGS. 4A and 4B, different rings may be divided into different numbers of coordinates. Additionally, each set of coordinates (each point) in the first portion of the points may be symmetric with a corresponding set of coordinates (point) in the second portion of the points.

The tessellation unit may also be configured to stitch points that reside along the first edge of the first ring with points that reside along a second edge of a second ring to divide the domain into a plurality of primitives that are mapped to a patch. In an example, the first set of coordinates may include a first coordinate for a first point in the first portion of the points, and the second set of coordinates includes a second coordinate for a second point in the second portion of the points. The first point and the second point are equidistant, in opposite directions, from a halfway location of the first edge.

Figure 5:
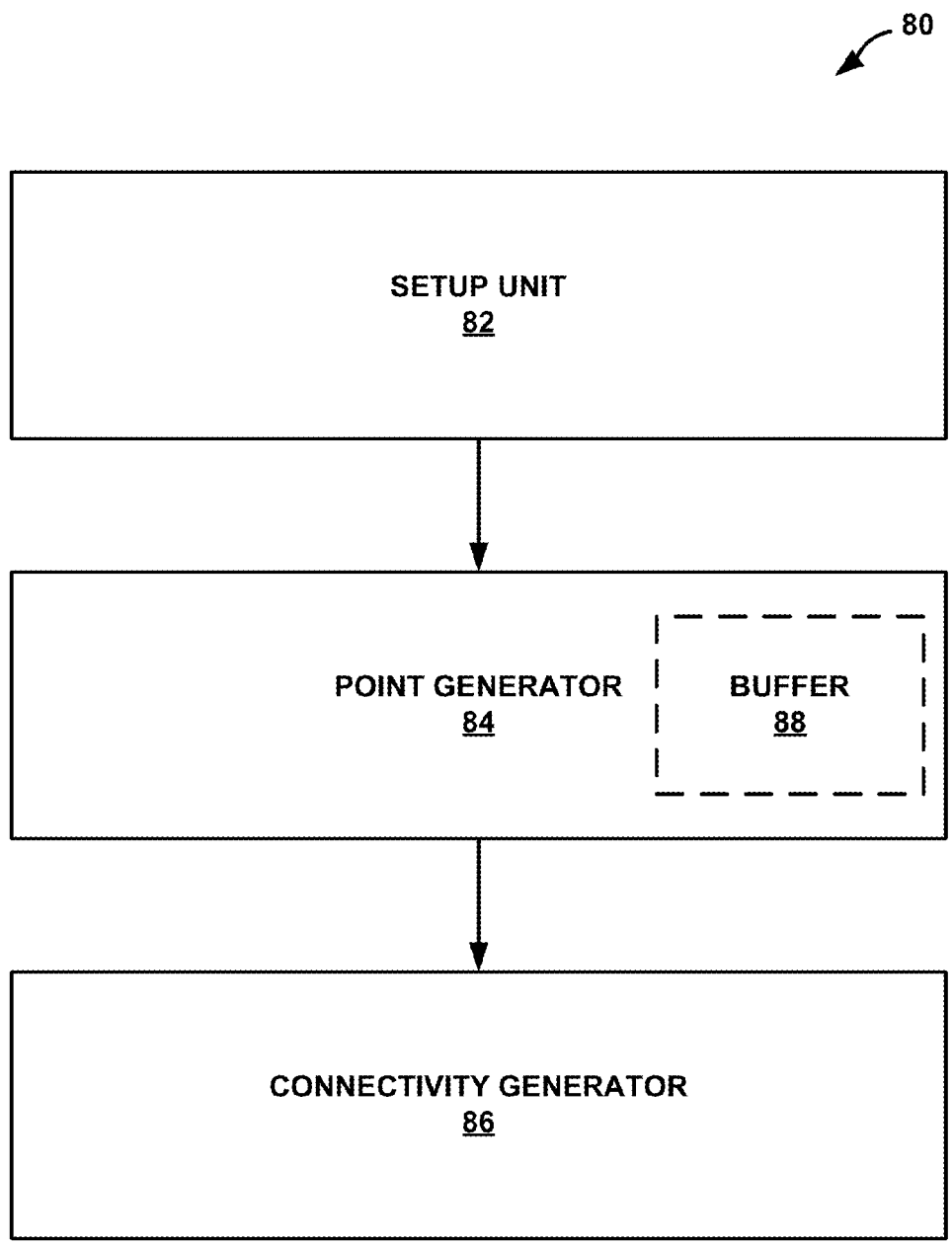
FIG. 5 is a block diagram illustrating an example of a tessellation unit in greater detail in accordance with one or more examples described in this disclosure.

FIG. 5 is a block diagram illustrating an example of a tessellation unit in greater detail in accordance with one or more examples described in this disclosure. For example, FIG. 5 illustrates tessellation unit 80. Examples of tessellation unit 80 include tessellation stage 24 of FIG. 1 and primitive generator 42 of FIG. 2.

Tessellation unit 80 may include setup unit 82, point generator 84, and connectivity generator 86, which may be fixed-function hardware units of tessellation unit 80. Setup unit 82, point generator 84, and connectivity generator 86 are illustrated as separate components for ease of description. Setup unit 82, point generator 84, and connectivity generator 86 may be formed as a single unit, as separate units, or a combination thereof.

Setup unit 82 may receive the tessellation factors as input a first shader unit such as hull shader stage 22 of FIG. 1 and tessellation control shader 40, and may determine the domain type from the tessellation factors. For example, if there are four tessellation factors, setup unit 82 may determine that the domain type is a triangle, and if there are six tessellation factors, setup unit 82 may determine that the domain type is a quad. Setup unit 82 may perform other setup functions such as correcting rounding problems, ceiling and floor functions, determining half tessellation factors, and reducing and combining tessellation factors. In general, setup unit 82 may process the tessellation factors to ensure that the other components of tessellation unit 80 can perform respective functions.

Point generator 84 may determine how many points reside along each edge of each ring of the domain, from the tessellation factors, and the locations of the points (e.g., the u, v coordinates or the u, v, w coordinates of the points). Connectivity generator 86 may connect (i.e., stitch) the points to form a plurality of primitives in the domain, such as those illustrated in FIGS. 4A and 4B.

Accordingly, the tessellation unit 80 determines a number of points that reside along a first edge of a first ring within a domain. This may be accomplished using the point generator 84. Point generator 84 may also determine a first set of coordinates for a first portion of the points that reside along the first edge of the first ring within the domain and determine a second set of coordinates for a second portion of the points that reside along the first edge of the first ring within the domain based on the first set of coordinates for the first portion.

For example, point generator 84 may determine coordinates of points along an outer ring edge, such as outer ring edge 62 and outer ring edge 72 of FIGS. 3A and 3B, respectively. In some examples, point generator 84 may store the determined coordinates in a buffer, such as buffer 88 in point generator 84 of FIG. 5. In an example, point generator 84 may store the first set of coordinates for the first portion of outer ring edge 62 or 72 in buffer 88 while storing the second set of coordinates for the second portion of outer ring edge 62 or 72 in another buffer. Point generator 84 may determine the second set of coordinates for the points of the second portion of outer ring edge 62 or outer ring edge 72 based on the determined coordinates for the first set of coordinates. This may be accomplished based on symmetry between the first and the second set of coordinates. In another example, point generator 84 may store both the first and the second set of coordinates in buffer 88.

It will be understood, however, that buffer 88 is illustrated in point generator 84 for ease of description. Buffer 88 may be located within tessellation unit 80 and may couple to both point generator 84 and connectivity generator 86. Alternatively, buffer 88 may be located within a local memory, such as cache memory, of GPU 14. In some examples, buffer 88 may be located within system memory 14.

In accordance with one or more examples similar to those described above, when the point generator 84 divides an edge into points, each of the points is spaced an equal distance apart from any left- or right-neighboring points. As an example, if the tessellation factor instructs point generator 84 to divide an edge into five points (an odd tessellation factor), the point generator 84 may divide the edge into points at x-coordinates: 0, 0.25, 0.5, 0.75, and 1. As an example, if the tessellation factor instructs the point generator 84 to divide the edge into four points (an even tessellation factor), the point generator 84 may divide the edge into points located at x-coordinates: 0, 0.33, 0.66, and 1. In both of the previous examples, there is symmetry between most of the points. For example, one point may be calculated from another point using the formula:

$$x(Pi)=1-x(Pn-i),$$

where i is the index from 0 to (the # of points−1) of a point, 'n' is the # of points−1, and x( ) is the function that returns the x-coordinate of the point. The equation x(Pi)=1−x(Pn−i) may be a restatement of the above equation X(N−n)=1−X(n), and is provided to further assist with understanding. As an example, if there are five points, each numbered 0 through 4 (denoted as P0 . . . P4), the point at position 3 may be calculated as:

$$x(P3)=1-x(P4-3)=$$

$$x(P3)=1-x(P1) \text{ (Substituting the value of } P1=0.25)=$$

$$x(P3)=1-0.25=$$

$$x(P3)=0.75$$

Thus, the x-coordinate value of the point at position 3 is 0.75. Based on this symmetry, the number of calculations required to determine the x-coordinate of each point may be reduced by using the above calculation rather than by determining the x-coordinate for each point on an edge individually. For instance, in the previous example, point generator 84 may determine the coordinate for P1 and from the value of P1 determine the value of P3. In this way, the techniques of this disclosure may exploit symmetry among points that reside on a normalized edge to determine the coordinates for such symmetrical points.

For each edge of the outer ring that is parallel with an edge of the inner ring, connectivity generator 86 may determine how the points of the outer ring edge should connect with the points of the inner ring edge to form primitives. For instance, there may be at least two different ways in which points along the outer ring edge and the points along the inner ring edge can form triangles. As one example, connectivity generator 86 may form a triangle using two points from the outer ring edge and one point from the inner ring edge, and connect them together to form a triangle. As another example, connectivity generator 86 may form a triangle using two points from the inner ring edge and one point from the outer ring edge to form the triangle. Accordingly, the connectivity generator 86 may stitch points that reside along the first edge of the first ring with points that reside along a second edge of a second ring to divide the domain into a plurality of primitives that are mapped to a patch.

Figure 6:
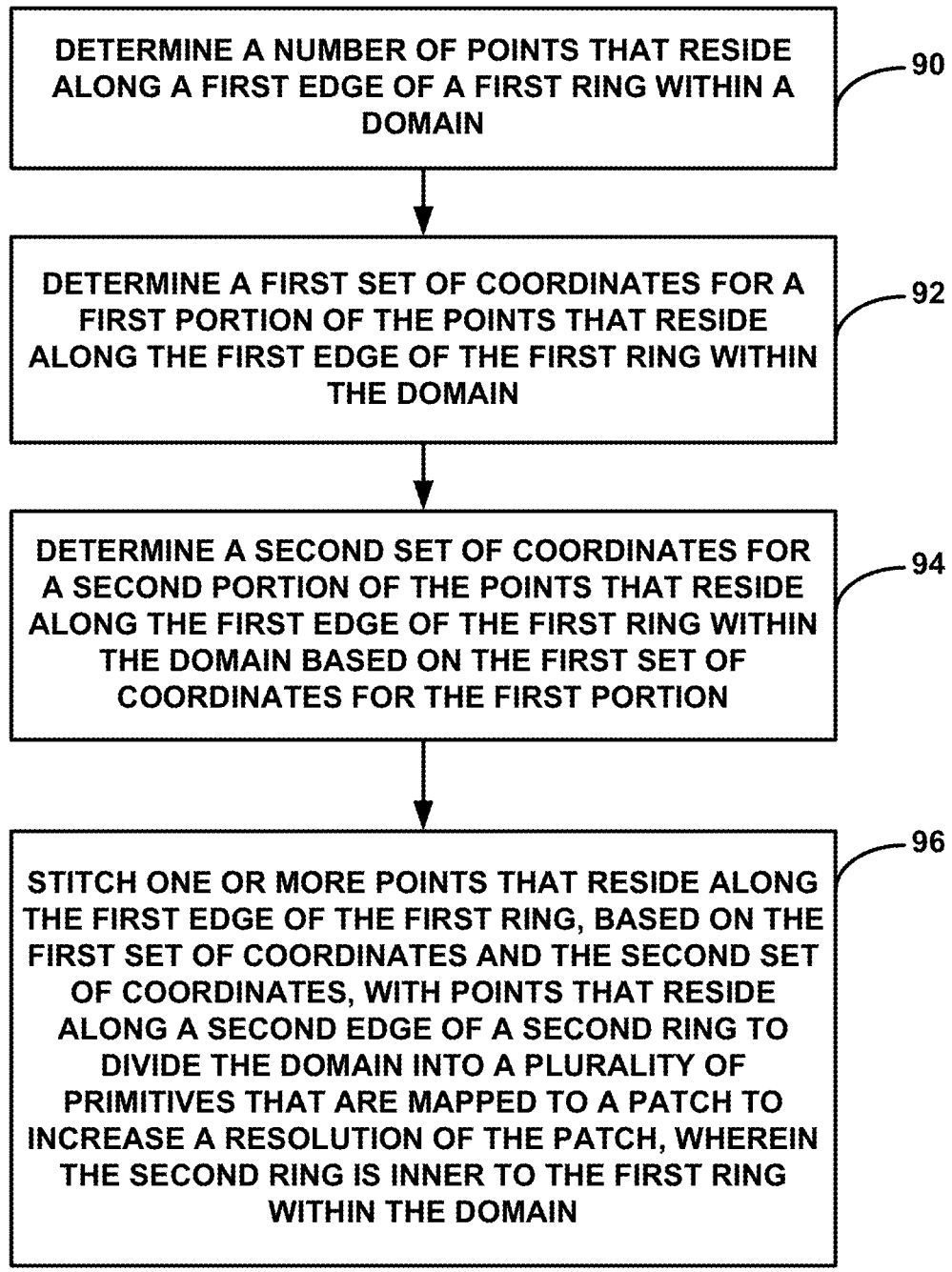
FIG. 6 is a flow chart illustrating an example method of determining points for tessellation in accordance with one or more examples described in this disclosure.

FIG. 6 is a flow chart illustrating an example method for tessellation in accordance with one or more examples described in this disclosure. For purposes of illustration only, reference is made to FIG. 5. As described above, FIG. 5 provides an example of a tessellation unit. Examples of the tessellation unit include tessellation stage 24 of FIG. 1 and primitive generator 42 of FIG. 2.

In an example system, a tessellation unit may determine a number of points that reside along a first edge of a first ring within a domain (90). This may occur, for example, in point generator 84 of FIG. 5. For example, the tessellation unit 80 may receive a tessellation factor for an edge of a ring. The tessellation unit 80 may also receive as input, a depth level value, which is one example of a tessellation factor.

The tessellation unit may determine a first set of coordinates for a first portion of the points that reside along the first edge of the first ring within the domain (92). This may also occur, for example, in point generator 84 of FIG. 5. The coordinates may be generated for a unit quad domain or a unit triangle domain, for example. Such domains may be normalized. For example, a normalized quad domain may have each of four edges normalized from "0" to "1" and have coordinates (0,0), (1,0), (0,1), (1,1) and a normalized triangle domain may have each of three edges normalized from "0" to "1" and have coordinates (0,0,1), (0,1,0), (1,0,0). Additionally, as discussed above, when using normalized Barycentric coordinates in the triangular domain, the sum of each coordinate set is always one, e.g., for (0,0,1) 0+0+1=1; for (0,1,0) 0+1+0=1; and for (1,0,0) 1+0+0=1.

For each edge of the ring, the point generator 84 may divide the edge into the number of points specified by the tessellation factor for that edge. Based on the tessellation factor, point generator 84 may repeat the process of subdividing edges into points once for each level of depth. For each level of depth, point generator 84 converges toward the center of the domain and subdivides not the original edge, but a concentric edge. Thus, for each level of depth, a concentric shape that is the same as the domain is subdivided into the number of points specified by the tessellation factor for that edge. If the depth level is even, the point generator 84 may create the final depth level as a single point rather than as a concentric version of the patch.

The tessellation unit may determine a second set of coordinates for a second portion of the points that reside along the first edge of the first ring within the domain based on the first set of coordinates for the first portion (94). This may also occur, for example, in point generator 84 of FIG. 5. For example, the tessellation unit may be designed to determine the coordinates of two symmetrical points of an edge in parallel to increase throughput. In this example, the tessellation unit may be configured to include point generator 84 capable of outputting two x-y coordinate pairs simultaneously. Point generator 84 may transmit the x-y coordinate pairs for both points to the connectivity generator in parallel. In some examples, Connectivity generator 88 may be configured to receive two x-y coordinate points at a time. In the case where connectivity generator 88 is capable of receiving two x-y coordinate pairs simultaneously, the tessellation unit may include two 4-deep first-in-first-out (FIFO) queues (that is, two FIFOs capable of holding 4 x-y coordinate pairs). For example, the tessellation unit, the local memory of GPU 12, or system memory 16 may include two buffers 88, where each of the two buffers 88 is a 4-deep FIFO queue.

The tessellation unit may stitch one or more points that reside along the first edge of the first ring. This may also occur, for example, in connectivity generator 86 of FIG. 5. The stitching may be based on the first set of coordinates and the second set of coordinates. Points that reside along a second edge of a second ring may divide the domain into a plurality of primitives that may be mapped to a patch to increase a resolution of the patch. The second ring may be inner to the first ring within the domain.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored as one or more instructions or code on a computer-readable medium. Computer-readable media may include computer data storage media. Data storage media may be any available media that can be accessed by one or more computers or one or more processors to retrieve instructions, code and/or data structures for implementation of the techniques described in this disclosure. By way of example, and not limitation, such computer-readable media can comprise random access memory (RAM), read-only memory (ROM), EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs (i.e., a chip set). Various components, modules or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

The invention claimed is:

1. A tessellation unit for graphics processing, the tessellation unit comprising:
   a first unit configured to:
      determine a number of points that reside along a first edge of a first ring within a domain;
      determine a first set of coordinates for a first portion of the points that reside along the first edge of the first ring within the domain;
      determine a second set of coordinates for a second portion of the points that reside along the same first edge of the same first ring within the domain based on the first set of coordinates for the first portion, and based on no other coordinates, wherein the second set of coordinates are determined at substantially the same time as when the first unit determines the first set of coordinates;
      store the first set of coordinates and the second set of coordinates in one or more buffers; and
      transmit the first set of coordinates and the second set of coordinates from the one or more buffers to a second unit at the same time; and
   the second unit configured to:
      receive the first set of coordinates and the second set of coordinates from the one or more buffers at the same time; and
      stitch one or more points that reside along the first edge of the first ring, based on the first set of coordinates and the second set of coordinates, with points that reside along a second edge of a second ring to divide the domain into a plurality of primitives that are mapped to a patch to increase a resolution of the patch, wherein the second ring is inner to the first ring within the domain.

2. The tessellation unit of claim 1, wherein the first unit comprises a point generator, and the second unit comprises a connectivity generator.

3. The tessellation unit of claim 1, wherein the first portion of the points includes a first half of the points that reside along the first edge, and the second portion of the points includes a second half of the points that reside along the first edge.

4. The tessellation unit of claim 1, wherein each point in the first portion of the points is symmetric with a corresponding point in the second portion of the points.

5. The tessellation unit of claim 1, wherein the second unit is configured to subtract each coordinate of the first set of coordinates from one to determine corresponding coordinates of the second set of coordinates.

6. The tessellation unit of claim 1,
   wherein the first set of coordinates includes a first coordinate for a first point in the first portion of the points, and
   the second set of coordinates includes a second coordinate for a second point in the second portion of the points,
   wherein the first point and the second point are equidistant, in opposite directions, from a halfway location of the first edge, and
   wherein the second unit is configured to subtract the first coordinate for the first point from one to determine the second coordinate for the second point.

7. The tessellation unit of claim 1, wherein:
   the first set of coordinates are determined to be a set of values X and the second set of coordinates are determined to be 1−X, the determination using the set of values X, and symmetry between the first and the second set of coordinates.

8. A method of tessellation comprising:
   determining a number of points that reside along a first edge of a first ring within a domain;
   determining a first set of coordinates for a first portion of the points that reside along the first edge of the first ring within the domain;
   determining a second set of coordinates for a second portion of the points that reside along the same first edge of the same first ring within the domain based on the first set of coordinates for the first portion, and based on no other coordinates, wherein the second set of coordinates are determined at substantially the same time as when the first unit determines the first set of coordinates;
   storing the first set of coordinates and the second set of coordinates in one or more buffers;
   transmitting the first set of coordinates and the second set of coordinates from the one or more buffers to a second unit at the same time;
   receiving the first set of coordinates and the second set of coordinates from the one or more buffers at the same time; and
   stitching one or more points that reside along the first edge of the first ring using at least one processor, wherein the stitching of the one or more points is based on the first set of coordinates and the second set of coordinates, with points that reside along a second edge of a second ring to divide the domain into a plurality of primitives that are mapped to a patch to increase a resolution of the patch, wherein the second ring is inner to the first ring within the domain.

9. The method of claim 8, further comprising using a point generator to (1) determine the number of points that reside along the first edge of the first ring within the domain, (2) determine the first set of coordinates for the first portion of the points that reside along the first edge of the first ring within the domain, and (3) determine the second set of coordinates for the second portion of the points that reside along the first edge of the first ring within the domain based on the first set of coordinates for the first portion; and a connectivity generator to stitch the one or more points that reside along the first edge of the first ring, based on the first set of coordinates and the second set of coordinates, with points that reside along the second edge of the second ring to divide the domain into the plurality of primitives that are mapped to the patch to increase the resolution of the patch, wherein the second ring is inner to the first ring within the domain.

10. The method of claim 8, wherein the first portion of the points includes a first half of the points that reside along the first edge, and the second portion of the points includes a second half of the points that reside along the first edge.

11. The method of claim 8, wherein each point in the first portion of the points is symmetric with a corresponding point in the second portion of the points.

12. The method of claim 8, further comprising subtracting each coordinate of the first set of coordinates from one to determine corresponding coordinates of the second set of coordinates.

13. The method of claim 8,
wherein the first set of coordinates includes a first coordinate for a first point in the first portion of the points, and the second set of coordinates includes a second coordinate for a second point in the second portion of the points,
wherein the first point and the second point are equidistant, in opposite directions, from a halfway location of the first edge, and
further comprising subtracting the first coordinate for the first point from one to determine the second coordinate for the second point.

14. The method of claim 8, wherein:
the first set of coordinates are determined to be a set of values X and the second set of coordinates are determined to be 1−X, the determination using the set of values X, and symmetry between the first and the second set of coordinates.

15. A tessellation unit comprising:
means for determining a number of points that reside along a first edge of a first ring within a domain;
means for determining a first set of coordinates for a first portion of the points that reside along the first edge of the first ring within the domain;
means for determining a second set of coordinates for a second portion of the points that reside along the same first edge of the same first ring within the domain based on the first set of coordinates for the first portion, and based on no other coordinates, wherein the second set of coordinates are determined at substantially the same time as when the first unit determines the first set of coordinates;
means for storing the first set of coordinates and the second set of coordinates in one or more buffers;
means for transmitting the first set of coordinates and the second set of coordinates from the one or more buffers to a second unit at the same time;
means for receiving the first set of coordinates and the second set of coordinates from the one or more buffers at the same time; and
means for stitching one or more points that reside along the first edge of the first ring, based on the first set of coordinates and the second set of coordinates, with points that reside along a second edge of a second ring to divide the domain into a plurality of primitives that are mapped to a patch to increase a resolution of the patch, wherein the second ring is inner to the first ring within the domain.

16. The tessellation unit of claim 15, wherein the first portion of the points includes a first half of the points that reside along the first edge, and the second portion of the points includes a second half of the points that reside along the first edge.

17. The tessellation unit of claim 15, wherein each point in the first portion of the points is symmetric with a corresponding point in the second portion of the points.

18. The tessellation unit of claim 15, further comprising means for subtracting each coordinate of the first set of coordinates from one to determine corresponding coordinates of the second set of coordinates.

19. The tessellation unit of claim 15,
wherein the first set of coordinates includes a first coordinate for a first point in the first portion of the points, and the second set of coordinates includes a second coordinate for a second point in the second portion of the points,
wherein the first point and the second point are equidistant, in opposite directions, from a halfway location of the first edge, and
further comprising means for subtracting the first coordinate for the first point from one to determine the second coordinate for the second point.

20. The tessellation unit of claim 15, wherein:
the first set of coordinates are determined to be a set of values X and the second set of coordinates are determined to be 1−X, the determination using the set of values X, and symmetry between the first and the second set of coordinates.

21. A device comprising:
a central processing unit (CPU);
a graphics processing unit (GPU) including:
a tessellation unit configured to:
determine a number of points that reside along a first edge of a first ring within a domain;
determine a first set of coordinates for a first portion of the points that reside along the first edge of the first ring within the domain;
determine a second set of coordinates for a second portion of the points that reside along the same first edge of the same first ring within the domain based on the first set of coordinates for the first portion, and based on no other coordinates, wherein the second set of coordinates are determined at substantially the same time as when the first unit determines the first set of coordinates;
store the first set of coordinates and the second set of coordinates in one or more buffers;
transmit the first set of coordinates and the second set of coordinates from the one or more buffers to a second unit at the same time;
receive the first set of coordinates and the second set of coordinates from the one or more buffers at the same time; and
stitch one or more points that reside along the first edge of the first ring, based on the first set of coordinates and the second set of coordinates, with points that reside along a second edge of a second ring to divide the domain into a plurality of primitives that are mapped to a patch to increase a resolution of the patch, wherein the second ring is inner to the first ring within the domain.

22. The device of claim 21, wherein the tessellation unit comprises a first unit and a second unit, wherein the first unit is configured to:
determine the number of points that reside along the first edge of the first ring within the domain;
determine the first set of coordinates for the first portion of the points that reside along the first edge of the first ring within the domain; and
determine the second set of coordinates for the second portion of the points that reside along the first edge of the first ring within the domain based on the first set of coordinates for the first portion; and
the second unit is configured to:
stitch one or more points that reside along the first edge of the first ring, based on the first set of coordinates and the second set of coordinates, with points that reside along the second edge of the second ring to divide the domain into the plurality of primitives that are mapped to the patch to increase the resolution of the patch, wherein the second ring is inner to the first ring within the domain.

23. The device of claim 22, wherein the first unit comprises a point generator, and the second unit comprises a connectivity generator.

24. The device of claim 22, wherein the second unit is configured to subtract each coordinate of the first set of coordinates from one to determine corresponding coordinates of the second set of coordinates.

25. The device of claim 22,
wherein the first set of coordinates includes a first coordinate for a first point in the first portion of the points, and the second set of coordinates includes a second coordinate for a second point in the second portion of the points,
wherein the first point and the second point are equidistant, in opposite directions, from a halfway location of the first edge, and
wherein the second unit is configured to subtract the first coordinate for the first point from one to determine the second coordinate for the second point.

26. The device of claim 21, wherein the first portion of the points includes a first half of the points that reside along the first edge, and the second portion of the points includes a second half of the points that reside along the first edge.

27. The device of claim 21, wherein each point in the first portion of the points is symmetric with a corresponding point in the second portion of the points.

28. The device of claim 21, wherein:
the first set of coordinates are determined to be a set of values X and the second set of coordinates are determined to be 1−X, the determination using the set of values X, and symmetry between the first and the second set of coordinates.

29. A non-transitory computer-readable medium, wherein the non-transitory computer-readable medium is not a signal, comprising instructions that when executed cause a programmable processor to:
determine a number of points that reside along a first edge of a first ring within a domain;
determine a first set of coordinates for a first portion of the points that reside along the first edge of the first ring within the domain;
determine a second set of coordinates for a second portion of the points that reside along the same first edge of the same first ring within the domain based on the first set of coordinates for the first portion, and based on no other coordinates, wherein the second set of coordinates are determined at substantially the same time as when the first unit determines the first set of coordinates;
store the first set of coordinates and the second set of coordinates in one or more buffers;
transmit the first set of coordinates and the second set of coordinates from the one or more buffers to a second unit at the same time;
receive the first set of coordinates and the second set of coordinates from the one or more buffers at the same time; and
stitch one or more points that reside along the first edge of the first ring, based on the first set of coordinates and the second set of coordinates, with points that reside along a second edge of a second ring to divide the domain into a plurality of primitives that are mapped to a patch to increase a resolution of the patch, wherein the second ring is inner to the first ring within the domain.

* * * * *